United States Patent [19]

Gunderson et al.

[11] 4,131,287
[45] Dec. 26, 1978

[54] ANNULAR SEAL

[75] Inventors: Richard H. Gunderson; William T. Ilfrey, both of Houston, Tex.

[73] Assignee: Exxon Production Research Company, Houston, Tex.

[21] Appl. No.: 814,080

[22] Filed: Jul. 11, 1977

[51] Int. Cl.² ............................................. F16J 15/08
[52] U.S. Cl. ................................... 277/191; 277/236; 277/9.5
[58] Field of Search .................. 277/110, 117–123, 277/191, 205, 915, 236

[56] References Cited

U.S. PATENT DOCUMENTS

| 488,434 | 12/1892 | Houston | 277/120 |
| 2,075,947 | 4/1937 | Kennedy | 277/117 |
| 3,378,269 | 4/1968 | Castor | 277/205 |
| 3,895,831 | 7/1975 | Fisher | 277/110 |

Primary Examiner—Robert I. Smith
Attorney, Agent, or Firm—W. K. Guest; G. D. Lawson

[57] ABSTRACT

A pressure energized seal to seal an annulus between two concentric cylindrical members, particularly well suited to be used as an annular casing seal in an oil and gas well. A circular sealing ring has both its upper and lower surfaces channeled to leave two upper sealing lips and two lower sealing lips which effect the seal by being forced against the sealing surfaces of the cylindrical members. Two circular setting rings can be used to spread the sealing lips into sealing engagement with the sealing surfaces of the cylindrical members. The setting rings would be partially disposed within the channels of the sealing ring and adapted to spread the sealing lips when the setting rings are moved toward the sealing ring.

10 Claims, 4 Drawing Figures

ANNULAR SEAL

BACKGROUND OF THE INVENTION

1. Field of the Invention

This invention pertains to a seal for sealing an annular volume existing between an outer cylindrical member and an inner cylindrical member. More specifically, the invention pertains to an annular casing seal for use in an oil and gas well.

2. Description of the Prior Art

Ever since wells have been dug, or bored, into the earth for various purposes, the need for some means of supporting the wall of the well has been recognized. This need exists in the drilling of oil and gas wells, but in addition, some means is needed to protect the fluids within the wellbore and the penetrated formations from contamination or escape.

It is common practice in oil and gas well drilling to use strings of pipe, known as casing, suspended from the wellhead to isolate the well from the various formations. When it becomes desirable to have casing within the wellbore, a string of casing suspended from a casing hanger body is run into position in the well on a running tool as is well known in the art. Ordinarily, the casing will then be cemented in place to prevent migration of fluids along the outside of the casing. Cement is pumped down the wellbore and naturally flows around the bottom edge of the casing and back up the outside of the casing. The cement displaces the fluid outside of the casing forcing that fluid to flow around and over the casing hanger body and into the wellbore where it is removed to the drilling installation.

It is essential that an annular casing seal be used near the upper end of the casing in the wellhead to prevent fluids from either entering or leaving the wellbore around the top of the casing. So after the casing has been cemented in place, the annular casing seal is run into the wellhead and set. After sufficient drilling, it may become necessary to have another string of casing run into the well. The procedure described above would then be repeated.

Nearly all casing seals in use today utilize an elastomeric element to effect the seal between the outer surface of a casing hanger body and a larger cylindrical member, which could either be another casing hanger body or the wellhead housing. One such casing seal in use today is described in U.S. Patent 3,797,864.

Elastomeric seal elements have certain drawbacks. They tend to lose their effectiveness when exposed to heat or to corrosive substances such as hydrocarbons or hydrogen sulfide or to great pressures for long periods of time. Due to these causes, as well as natural aging, elastomers harden and become brittle. Once elastomeric seals lose their resiliancy they become very ineffective in preventing leaks.

Long exposures to high pressures not only tend to harden the elastomeric seal element, but the pressure can also cause the seal to flow and creep. As oil wells are drilled offshore in deeper water, the pressures on the casing seals increase dramatically. Since the wellhead is located at the bottom of the body of water, the casing seals will be subjected to great hydrostatic pressures. Besides the hydrostatic forces, which are of continuing nature, the formation fluids will occasionally generate extreme pressures within the wellbore which require the blowout preventers to be closed to control the well. The casing seals must contain the pressurized fluids within the wellbore. In these instances, the pressures applied to the casing seals can exceed 5,000 pounds per square inch.

It should also be noted that a certain amount of force is needed to set, or energize, a seal. In deep water offshore drilling, this force must be transmitted from the drilling unit at the surface of the body of water. Transmitting large, but controlled, forces from the surface to the wellhead to set a seal to resist great pressures can present formidable technical problems. Naturally, the greater the pressure an elastomeric nonpressure energized seal element must contain, the greater the pressure that will ordinarily be required to set the seal.

The casing seal disclosed in the aforementioned U.S. Patent 3,797,864, discloses a seal which is a combination elastomeric and metal to metal seal. The elastomeric element is the primary seal, but several metallic sealing lips are provided. The sealing lips are oriented in a manner such that fluid pressure acting on the seal will tend to force the sealing lips on the side of the seal affected by the pressure away from the sealing surfaces. However, if the elastomeric seal leaks and if the other or second set of metal sealing lips have previously been forced into contact with the annular walls, then this second set of lips will be pressure energized. In this sense, this could be a metal to metal pressure energized seal but whether the necessary forces to obtain the requisite initial metal to metal contact of the second set of sealing lips against the annular walls can be transmitted to those sealing lips is uncertain, especially if the elastomeric element has deteriorated to the point where it is leaking.

It can be seen that commonly used casing seals may not effectively and efficiently overcome the problems that exist in deep water offshore wells or in corrosive environments.

SUMMARY OF THE INVENTION

The present invention is an improved annular seal which can utilize a nonelastomeric sealing element such as one made from metal or plastic etc. The present invention can be used for sealing an annular volume existing between two cylindrical members. The present invention is especially well suited for use as a casing seal in an oil or gas well.

The present invention utilizes a circular sealing ring and two circular setting rings disposed on opposite sides of the sealing ring. There are four sealing lips projecting from the sealing ring which actually effect the seal. Two of the sealing lips define a channel within which one of the setting rings is partially disposed and the other two sealing lips define a second channel within which the other setting ring is partially disposed. The surfaces of the setting rings and the sealing lips which contact each other when the setting rings are moved toward the sealing ring are adapted in a manner such that the sealing lips are spread into sealing contact with the sealing surfaces of the cylindrical members.

Once the seal has been placed into the annular volume between the two cylindrical members, means are provided for moving the setting rings and the sealing ring relative to each other to spread the sealing lips into sealing contact with the sealing surfaces of the cylindrical members.

Means for connecting the setting rings and sealing ring are also provided. These means will enable the entire seal to be lowered into and removed from the annular volume as a unit. Included are mating notches in the sealing lips of the sealing ring and in the setting rings.

Fluid pressure acting on the seal of the present invention will force the sealing lips into tighter contact with the sealing surfaces of the cylindrical members to effect an even tighter seal. In other words, he seal is pressure energized. This feature of the present invention should allow the use of a smaller force to set the seal than that would be needed for setting an elastomeric nonpressure energized seal.

Additionally, if a nonelastomeric seal element is utilized in the present invention, a proper selection of materials can be made for the seal element which will overcome the deterioration problems experienced with the prior art elastomeric seals.

DESCRIPTION OF THE PREFERRED EMBODIMENT

Figure 1:
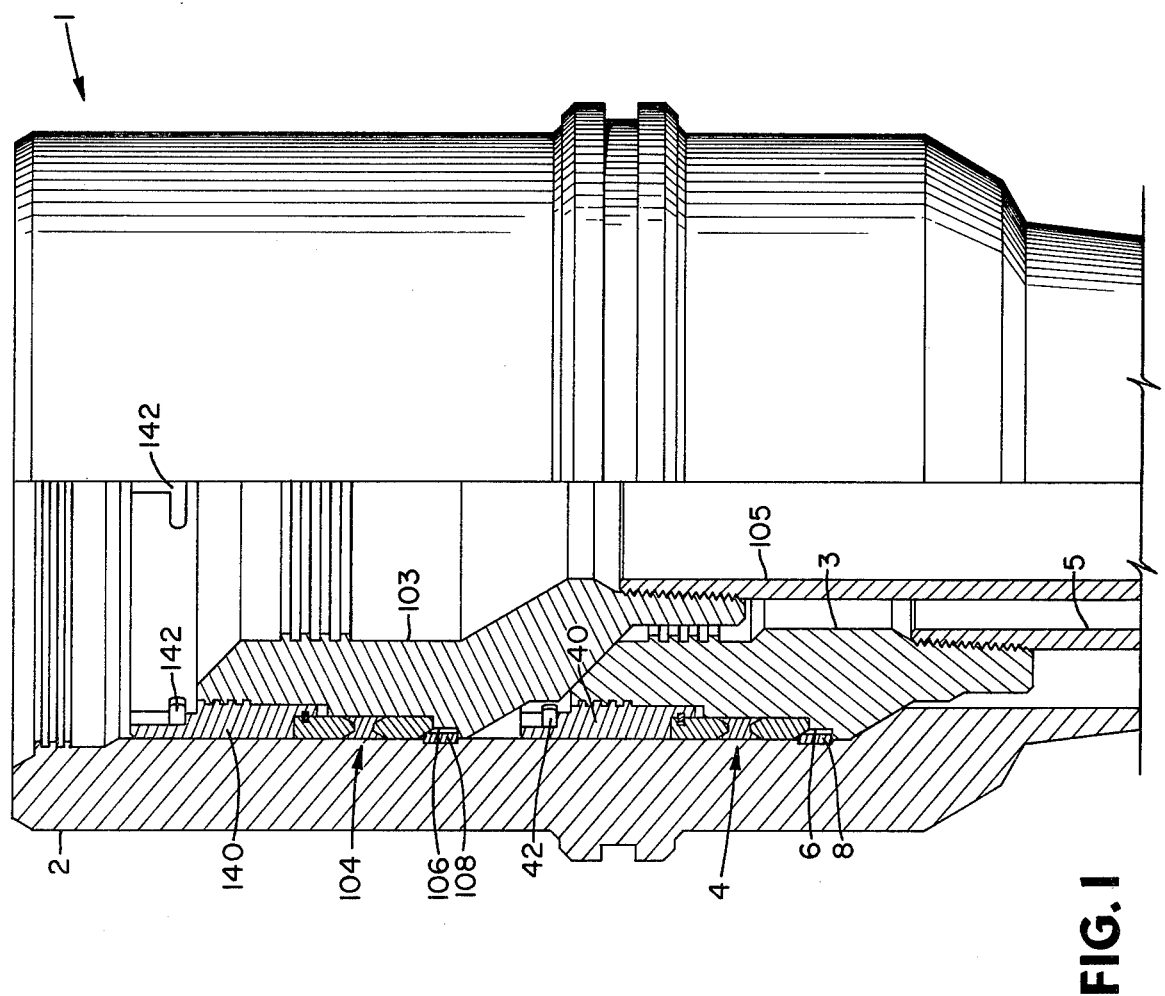
FIG. 1 is an elevation view in quarter section of a typical wellhead casing hanger system utilizing casing seals according to one embodiment of the present invention.

A typical wellhead casing hanger assembly 1 embodying apparatus of the present invention is illustrated in FIG. 1. The wellhead housing 2 performs three important functions. It acts as a foundation pile for supporting the blowout preventer stack or production tree and provides both support and a sealing surface for the casing strings. Two strings of casing 5 and 105 are suspended from two casing hanger bodies 3 and 103. The casing hanger body 3 seats on a downwardly tapering shoulder within the wellhead housing 2 and is locked down by split lock ring 8. A casing seal assembly 4, also known as a packoff assembly, seals the annular volume between the casing hanger body 3, the inner cylindrical member, and the wellhead housing 2, the outer cylindrical member.

A second string of casing 105 is suspended from casing hanger body 103. The casing hanger body 103 seats on top of casing hanger body 3 and is locked in place by split lock ring 108. A casing seal assembly 104 is used to seal the annulus between the casing hanger body 103 and the wellhead housing 2.

Figure 2:
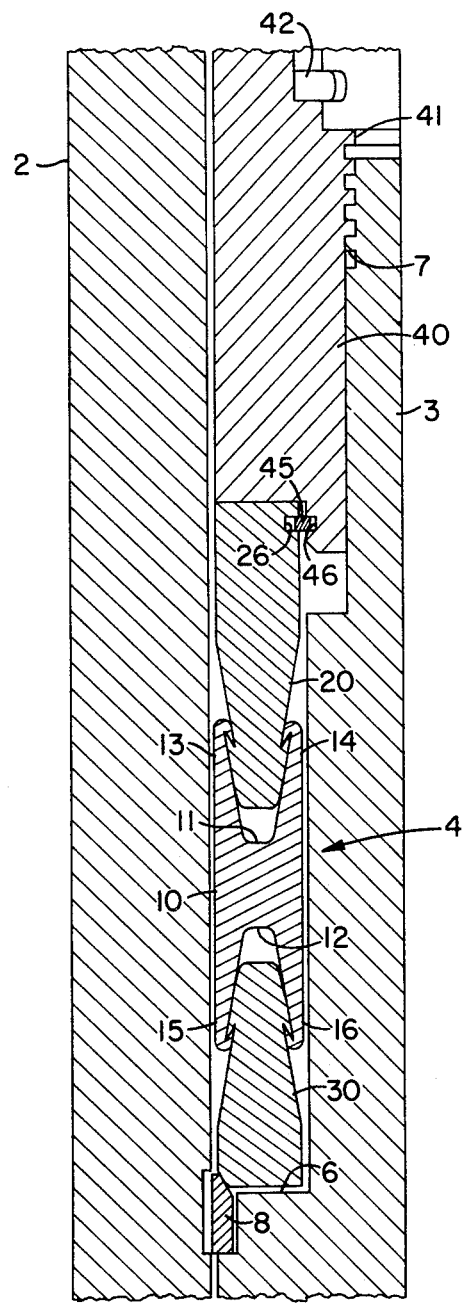
FIG. 2 is a cross sectional view of the casing seal assembly shown in FIG. 1 before the seal has been set.
Figure 3:
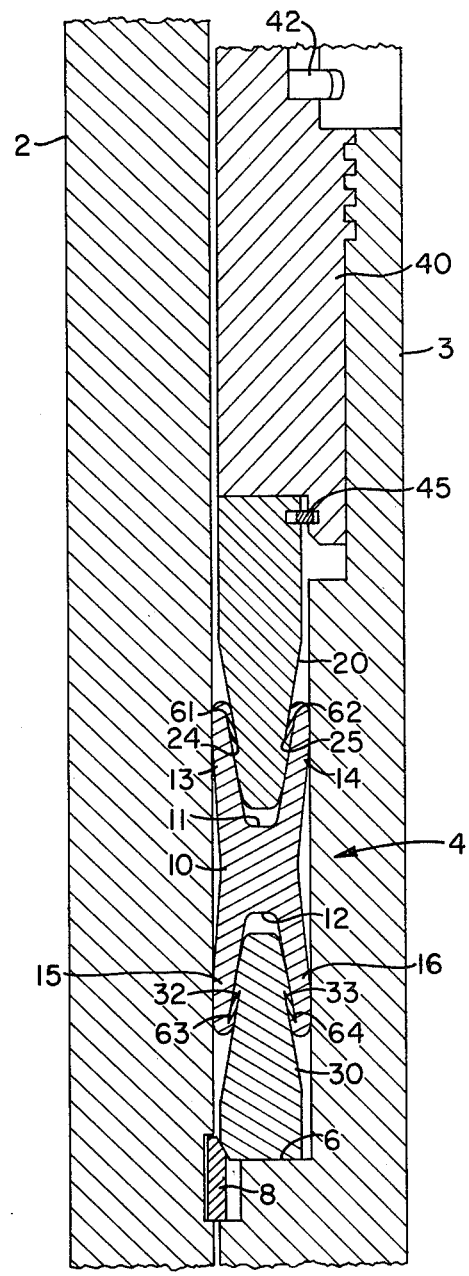
FIG. 3 is a cross sectional view of the same casing seal assembly shown in FIG. 2 after the seal has been set.

The casing seal assembly 4 is depicted in greater detail in FIGS. 2 and 3. FIG. 2 depicts the casing seal assembly 4 prior to the seal being set and FIG. 3 depicts the same casing seal assembly 4 after the seal has been set.

The casing seal assembly 4 positions a sealing ring 10 adjacent the designed sealing surfaces on the outside of the casing hanger body 3 and the inside of the wellhead housing 2. The casing seal assembly 4 is actuated to set the seal and maintain it in place.

The sealing ring 10 is a key item in the casing seal assembly 4. The sealing ring 10 of the present invention is circular so as to seal the annular gap between the wellhead housing 2 and the casing hanger body 3. It is not unusual in present day wellhead equipment to have a gap of about three quarters of an inch between the wellhead housing 2 and the casing hanger body 3.

The sealing ring 10 has two sealing lips 13 and 14 which project in one direction, this direction being upward as depicted in the embodiment of FIGS. 2 and 3. Two other sealing lips 15 and 16 project in the opposite direction, downward as illustrated. The two upper sealing lips 13 and 14 thereby define a channel 11. Similarly, sealing lips 15 and 16 define a channel 12 in the lower side of the sealing ring 10.

To effect a seal, sealing lips 13 and 15 are forced outward against the inside sealing surface of the wellhead housing 2 and sealing lips 14 and 16 are forced inward against the outside sealing surface of the casing hanger body 3. Of course, how far the sealing lips will have to be spread will be a function of the gap between the sealing surfaces of the wellhead housing 2 and the casing hanger body 3 and the thickness of the sealing ring element 10. The designed initial clearances between the sealing ring element 10 and the sealing surfaces defining the annulus will be governed to a great extent by the permissible plastic strain of the sealing ring material.

Preferably, the sealing ring 10 should be made of a material strong enough to withstand the anticipated pressures and ductile enough to effect a good seal. Utilizing a ductile material for the sealing ring 10 will allow a certain amount of yielding to occur in the lips of the sealing ring 10 as they are forced against the wellhead housing 2 and the casing hanger body 3. A limited amount of yielding will allow the sealing lips to conform to irregularities in the sealing surfaces of the wellhead housing 2 and the casing hanger body 3 so as to leave no gaps between the lips of the sealing ring 10 and the sealing surfaces. Preferably, the material's ductility should allow an elongation of between 30% and 50% before breakage. In the demanding environment of offshore oil and gas wells, a metal such as a low carbon steel of high ductility can be used. The metal should act plastically when subjected to the sealing pressures. AISI 1020 carbon steel is one metal that can be used for the sealing ring. Other materials such as special alloys can be appropriate in other environments.

Partially disposed between the lower sealing lips 15 and 16 is a lower setting ring 30. The lower setting ring 30 is circular and designed to spread the sealing lips 15 and 16 when it is moved further into channel 12 toward the sealing ring 10. The lower setting ring 30 should preferably be made of a material that is stronger and harder than the material used to make the sealing ring 10. Using a material selected accordingly will result in the outside of the sealing lips 15 and 16 yielding to conform to the sealing surfaces of the wellhead housing 2 and the casing hanger body 3 rather than the lower setting ring 30 yielding to conform to the inside surfaces of the sealing lips 15 and 16 when the seal is set. To have an effective seal, conformance of the sealing lips 15 and 16 to the sealing surfaces of the wellhead housing 2 and the casing hanger body 3 is all important, whereas the conformance of the inside of sealing lips 15 and 16 to the lower setting ring 30 is, in and of itself, irrelevant. To assure that the sealing ring 10 deforms to effect the seal, it would be preferred that not only the lower setting ring 30 but also the wellhead housing 2 and the casing hanger body 3 have a strength and hardness somewhat greater than that of the sealing ring 10. If the sealing ring 10 is made from AISI 1020 carbon steel, the lower setting ring 30 can be made from AISI 4130 carbon steel.

One additional criterion which should preferably be used in selecting the materials for the casing seal assembly if metallic materials are used is that the casing seal assembly, the wellhead housing and the casing hanger body should not be made of dissimilar metals. This will minimize the possible failure of the casing seal by corrosion through electrolysis.

The shapes of channel 12 and the upper end of lower setting ring 30 should be designed to facilitate the spreading of the sealing lips 15 and 16. In the embodiment illustrated in FIGS. 2 and 3, both channel 12 and the upper end of the lower setting ring 30 are tapered. The channel 12 is tapered toward the center of the sealing ring 10 and the upper end of the lower setting ring 30 is tapered toward its upper end. As one skilled in the art will readily appreciate, it is not necessary that both the channel 12 and the upper end of the lower setting ring 30 be tapered in the manner shown to achieve the objective of spreading the sealing lips 15 and 16 into sealing contact with the sealing surfaces of the wellhead housing 2 and the casing hanger body 3. For example, only the channel 12 or only the upper end of the lower setting ring 30 might be tapered as shown while the other is not tapered.

The circular upper setting ring 20 is partially disposed in channel 11 between sealing lips 13 and 14. Just as the lower setting ring 30 is designed to spread sealing lips 15 and 16, the upper setting ring 20 is designed to spread sealing lips 13 and 14 into sealing contact with the sealing surfaces of the wellhead housing 2 and the casing hanger body 3 when moved further into channel 11 toward sealing ring 10. The same considerations discussed above in selecting the material from which to make the lower setting ring 30 would apply as well in selecting the material to be used for making the upper setting ring 20. Further, the considerations discussed above regarding the shapes of the channel 12 and the upper end of the lower setting ring 30 would also apply to the shapes of the channel 11 and the lower end of the upper setting ring 20.

A packoff nut 40 is attached to the upper setting ring 20 by a split lock ring 45. The split lock ring 45 is mounted in two aligned grooves, an external groove 46 in the packoff nut 40 and an internal groove 26 in the upper setting ring 20. This means of connection prevents the packoff nut 40 and the upper setting ring 20 from separating when the casing seal assembly 4 is lowered into the wellhead or removed therefrom. This means of connection also allows the packoff nut 40 to rotate about a vertical axis while the upper setting ring 20 remains stationary. It is important in obtaining a good seal that the upper setting ring 20, the sealing ring 10 and the lower setting ring 30 not be rotated about a vertical axis both during and after the setting of the seal. To facilitate the rotation of the packoff nut 40, it is advisable to have the contacting surfaces of the packoff nut 40 and the upper setting ring 20 as friction free as possible. This may be accomplished by coating these surfaces with teflon. As an alternative to coating the surfaces, a thrust bearing may be provided between the packoff nut 40 and the upper setting ring 20.

The packoff nut 40 has internal threads 41 which mate with external threads 7 of the casing hanger body 3. Through the intermeshing of these threads, the casing seal is set. The packoff nut 40 has several interior T-slots 42 located near the upper end of the packoff nut which are used for connecting the casing seal assembly 4 to a running and actuating tool. Note that J-slots could also work. (In FIG. 1, the slot 142 can be seen in the upper packoff nut 140).

The basic scheme of running casing into a wellbore, cementing it in place and sealing the annulus about the casing has been previously discussed herein. The detailed procedures, as well as a possible running and actuating tool, are shown and described in U.S. Patent 3,492,026. The tool apparatus disclosed in that patent could be used to run and set the casing seal assembly 4 of the present invention. The tool apparatus would connect to the packoff nut 40 via the T-slots 42. Once the casing has been cemented in place, the seal of the present invention is set by the running and actuating tool. The casing seal assembly 4 is attached to the tool and lowered until threads 41 of the packoff nut 40 and threads 7 of the casing hanger body 3 engage. The tool then rotates the packoff nut 40 to further lower the entire casing seal assembly 4. This rotation will lower the casing seal assembly 4 to seat the lower wedge ring 30 upon a shoulder 6 of the casing hanger body 3. Continued rotation of the packoff nut 40 sets the seal by transforming the torque, which rotates the packoff nut 40, into a vertical compressive force which causes the upper and lower wedge rings 20 and 30 to be forced into channels 11 and 12, respectively. This will spread the sealing lips 13, 14, 15 and 16 into sealing contact with the inner sealing surface of the wellhead housing 2 and the outer sealing surface of the casing hanger body 3. Once the seal has been set, the running and actuating tool is disengaged from the packoff nut 40 and removed from the well so that normal drilling operations may resume.

FIG. 3 depicts the casing seal assembly 4 of FIG. 2 after the seal has been set. Sealing lips 13 and 14 have been spread apart by the upper setting ring 20 to sealingly contact, respectively, the inner sealing surface of the wellhead housing 2 and the outer sealing surface of the casing hanger body 3. Sealing lips 13 and 14 will primarily prevent fluid flow from within the wellbore, around the top of the casing hanger body 3 and down the annular volume surrounding the casing string 5, which is hung from the casing hanger body 3. The orientation of sealing lips 13 and 14 makes them pressure energized. That is, the pressure of the fluid within the wellbore acting on sealing lips 13 and 14 will tend to further spread sealing lips 13 and 14 to make the seal even more effective.

Similarily, the lower setting ring 30 has spread the sealing lips 15 and 16 into sealing contact with, respectively, the inner sealing surface of the wellhead housing 2 and the outer sealing surface of the casing hanger body 3. These lips will primarily prevent fluid flow from the annular volume surrounding the casing string 5, which is hung from casing hanger body 3, upward and around casing hanger body 3 into the wellbore. Due to the orientation of sealing lips 15 and 16, they will be pressure energized. The greater the pressure acting in an upward direction on sealing lips 15 and 16, the greater will be the forces tending to spread sealing lips 15 and 16 into tighter contact with the wellhead housing 2 and the casing hanger body 3 to make the seal even more effective.

Occasionally, it may become desirable to remove the casing seal assembly 4, either to replace it or maybe to remove the casing string 5. The embodiment of the present invention disclosed in FIGS. 2 and 3 is made retrievable by notches in the setting rings 20 and 30 and in the sealing lips 13, 14, 15 and 16. To remove the casing seal assembly 4, a running and actuating tool, such as the one used to set the seal, can be run into the wellbore and attached to the packoff nut 40 via the T-slots 42. The tool can then rotate the packoff nut 40 in the opposite direction that the packoff nut 42 was rotated to set the seal. The interaction of threads 41 and threads 7 will transform the torque into an upward vertical force on the packoff nut 40. This upward vertical force is transmitted to the upper setting ring 20 from the packoff nut 40 through the split lock ring 45. This will pull the upper setting ring 20 upward away from the sealing ring 10. As the upper setting ring 20 is withdrawn from channel 11, notches 24 and 25 in the upper setting ring 20 will catch mating notches 61 and 62 in the sealing lips 13 and 14. The mating of these notches will transmit the upward vertical force from the upper ring 20 to the sealing ring 10. It would be preferred to have the surfaces of the notches inclined in such a manner that as the upper setting ring 20 is withdrawn from channel 11, the interaction of the notches will tend to pull lips 13 and 14 inward away from the inner surface of the wellhead housing 2 and the outer surface of the casing hanger body 3.

The upward vertical force combined with the shapes of channel 12 and the upper end of the lower setting ring 30 should overcome the initial binding of the sealing lips 15 and 16 against the sealing surfaces of the wellhead housing 2 and the casing hanger body 3. The sealing lips 15 and 16 are provided with notches 63 and 64 which will mate with notches 32 and 33 in the lower setting ring 30, should the lower setting ring 30 start to fall out of channel 12. Thus, the entire casing seal assembly 4 is removed as a unit.

There may be instances when the pressures setting the seal are so high, or the material from which sealing ring 10 is made is so ductile, that the mating notches of the setting rings 20 and 30 and the sealing lips will not withstand the upward vertical force needed to remove the casing seal assembly 4. In instances where this is anticipated, additional retrievel apparatus can be incorporated into the casing seal assembly 4. This additional apparatus will more securely connect the setting rings 20 and 30 to the sealing ring 10 when the assembly is subjected to forces tending to pull the assembly apart, as are encountered when the casing seal assembly 4 is being retrieved.

Figure 4:
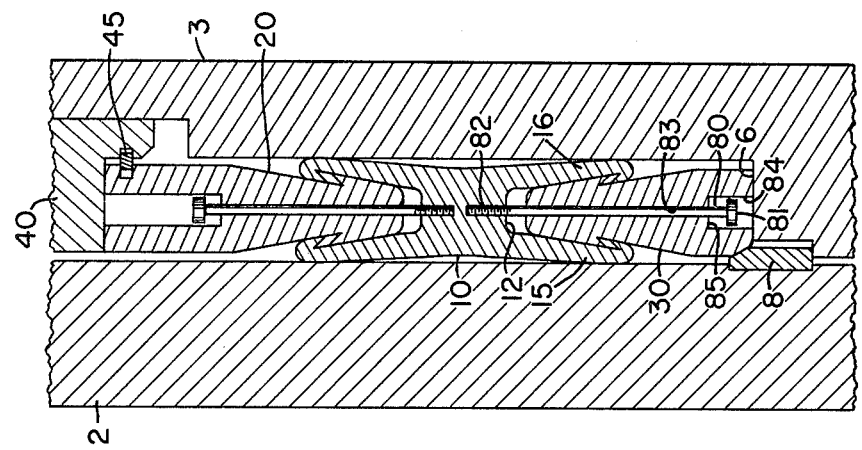
FIG. 4 is a cross sectional view of a casing seal assembly according to one embodiment of the present invention detailing additional apparatus which can be incorporated into the seal assembly to assist in retrieving the seal assembly.

FIG. 4 depicts one embodiment of such alternative retrieval apparatus. This retrieval apparatus will be described as used to connect the lower setting ring 30 to the sealing ring 10, but it should be noted that this discussion also applies to the connection between the upper setting ring 20 and the sealing ring 10. At intervals spaced around the casing seal assembly 4, a small hole 83 is drilled completely through the lower setting ring 30. A larger coaxial hole 84 is formed in the lower part of the lower setting ring 30. These two holes define a shoulder 85. A retrieval rod, ie. a threaded bolt 80 as depicted in FIG. 4 or similar type fastening apparatus, is run through the smaller hole 83 and securely attached to the sealing ring 10. As depicted, the threaded end 82 of the retrieval bolt 80 secures the bolt 80 to the sealing ring 10. The diameter of the retrieval bolt 80 is such that lower setting ring 30 easily slides on the bolt 80 without binding.

The overall length of the retrieval bolt 80 and the distance to which it penetrates the sealing ring 10 should be designed to place the bolt head 81 in a location satisfying several criteria. First, when the seal is being set by the lower setting ring 30 being forced into channel 12, the bolt head 81 should not contact the shoulder 6 of the casing hanger body. Second, the bolt head 81 should not contact shoulder 85 unless the lower setting ring 30 is positioned far enough out of the channel 12 so that the sealing lips 15 and 16 are not being wedged against the wellhead housing 2 and the casing hanger body 3 by the lower setting ring 30.

As mentioned above, the same apparatus can be used to connect the upper setting ring 20 to the sealing ring 10. It should be noted that there should never be a hole extending completely through the sealing ring 10 if it would allow fluid communication across the sealing ring 10.

The casing seal assembly of the present invention requires no elastomeric elements which deteriorate when exposed to corrosive substances or to high pressures for long periods of time. Additionally, the arrangement of the sealing lips of the present invention causes them to be forced into tighter sealing contact with the sealing surfaces of the wellhead housing and casing hanger body as the fluid pressures acting upon the seal increase. In other words, the casing seal of the present invention is pressure energized. So, the force needed to set the seal should not be as large a force as needed to set a nonpressure energized elastomeric seal element. The preferred values for the ductility and hardness for the elements of the seal described herein correspond in general to the characteristics of materials used in API ring joint flanges with pressure energized rings where the rings are softer than the ring grooves and are "coined" into sealing contact as the two halves of the flange are drawn into face to face contact. See API Specification 6A, 10th Edition.

The principle of the invention and the best mode in which it is contemplated to apply that principle have been described. It is to be understood that the foregoing is illustrative only and that other means and techniques can be employed without departing from the true scope of the invention defined in the following claims.

What we claim is:

1. A seal for sealing an annular volume existing between an outer cylindrical member having an inner sealing surface and an inner cylindrical member having an outer sealing surface comprising:

a sealing ring adapted to be positioned between the sealing surfaces of the cylindrical members, the sealing ring having a first set of two sealing lips projecting in one direction from the sealing ring defining a first channel where one of the sealing lips is capable of sealingly contacting the inner sealing surface of the outer cylindrical member, and the other sealing lip is capable of sealingly contacting the outer sealing surface of the inner cylindrical member, the sealing ring having a second set of two sealing lips projecting in the opposite direction as the first set of sealing lips from the sealing ring defining a second channel where one sealing lip of the second set of two sealing lips is capable of sealingly contacting the inner sealing surface of the outer cylindrical member and the other sealing lip of the second set of two sealing lips is capable of sealingly contacting the outer sealing surface of the inner cylindrical member;

a first setting ring at least partially disposed within the first channel and capable of contacting the sealing lips defining the first channel;

a second setting ring at least partially disposed within the second channel and capable of contacting the sealing lips defining the second channel, the surfaces of the setting rings and the sealing lips which contact each other when the setting rings are moved toward the sealing ring being adapted in a manner such that the sealing lips are spread into sealing contact with the sealing surfaces of the cylindrical members when the setting rings are moved toward the sealing ring; and means for connecting the setting rings to the sealing ring.

2. The apparatus of claim 1 wherein the means for connecting the setting rings to the sealing ring are mating notches in the setting rings and in the sealing lips of the sealing ring.

3. The apparatus of claim 2 wherein the notches are inclined in a manner to pull the sealing lips away from the sealing surfaces of the cylindrical members as the setting rings and the sealing ring are being moved apart.

4. An oil and gas well casing seal for sealing the annular volume existing between a vertically extending outer cylindrical member having an inner sealing surface and a vertically extending inner cylindrical member having an outer sealing surface, one of the cylindrical members having a shoulder extending into the annular volume below the sealing surfaces, comprising:

a circular sealing ring having both its upper and lower surfaces channeled to leave two upper sealing lips and two lower sealing lips;

a circular lower setting ring having its lower end adapted to seat upon the shoulder extending into the annular volume and having its upper end disposed within the lower channel of the sealing ring and adapted to spread the lower sealing lips of the sealing ring into sealing engagement with the sealing surfaces of the cylindrical members as the lower setting ring and the sealing ring are moved toward each other;

a circular upper setting ring having its lower end disposed within the upper channel of the sealing ring and adapted to spread the upper sealing lips of the sealing ring into sealing engagement with the sealing surfaces of the cylindrical members as the upper setting ring and the sealing ring are moved toward each other; and means for connecting the setting rings to the sealing ring.

5. The apparatus of claim 4 wherein the means for connecting the setting rings to the sealing ring are mating notches in the sealing lips of the sealing ring and in the lower end of the upper setting ring and in the upper end of the lower setting ring.

6. The apparatus of claim 5 wherein the notches are inclined in a manner to pull the sealing lips away from the sealing surfaces of the cylindrical members as the setting rings and the sealing ring are being moved apart.

7. A seal for sealing an annular volume existing between an outer cylindrical member having an inner sealing surface and an inner cylindrical member having an outer sealing surface comprising:

a sealing ring adapted to be positioned between the sealing surfaces of the cylindrical members, the sealing ring having a first set of two sealing lips projecting in one direction from the sealing ring defining a first channel where one of the sealing lips is capable of sealingly contacting the inner sealing surface of the outer cylindrical member, and the other sealing lip is capable of sealingly contacting the outer sealing surface of the inner cylindrical member, the sealing ring having a second set of two sealing lips projecting in the opposite direction as the first set of sealing lips from the sealing ring defining a second channel where one sealing lip of the second set of two sealing lips is capable of sealingly contacting the inner sealing surface of the outer cylindrical member and the other sealing lip of the second set of two sealing lips is capable of sealingly contacting the outer sealing surface of the inner cylindrical member;

a first setting ring at least partially disposed within the first channel and capable of contacting the sealing lips defining the first channel;

a second setting ring at least partially disposed within the second channel and capable of contacting the sealing lips defining the second channel, the surfaces of the setting rings and the sealing lips which contact each other when the setting rings are moved toward the sealing ring being adapted in a manner such that the sealing lips are spread into sealing contact with the sealing surfaces of the cylindrical members when the setting rings are moved toward the sealing ring; and means for moving the setting rings toward the sealing ring to spread the sealing lips into sealing contact with the sealing surfaces of the cylindrical members comprising a shoulder projecting from one of the cylindrical members into the annular volume adjacent the sealing surfaces of the cylindrical members and adapted to contact the second setting ring so that the second ring seats against the shoulder; external threads on a portion of the outer surface of the inner cylindrical member adjacent the sealing surfaces of the cylindrical members; and a packoff nut having internal threads to mate with the external threads on the inner cylindrical member and adapted to contact the first setting ring so that the first setting ring seats against the packoff nut, the external threads being located to allow the packoff nut when engaged with the external threads and rotated to seat the second setting ring against the shoulder and thereafter to move the setting rings toward the sealing ring to spread the sealing lips into sealing contact with the sealing surfaces of the cylindrical members.

8. An oil and gas well casing seal for sealing the annular volume existing between a vertically extending outer cylindrical member having an inner sealing surface and a vertically extending inner cylindrical member having an outer sealing surface, one of the cylindrical members having a shoulder extending into the annular volume below the sealing surfaces, comprising:

a circular sealing ring having both its upper and lower surfaces channeled to leave two upper sealing lips and two lower sealing lips;

a circular lower setting ring having its lower end adapted to seat upon the shoulder extending into the annular volume and having its upper end disposed within the lower channel of the sealing ring and adapted to spread the lower sealing lips of the sealing ring into sealing engagement with the sealing surfaces of the cylindrical members as the lower setting ring and the sealing ring are moved toward each other;

a circular upper setting ring having its lower end disposed within the upper channel of the sealing ring and adapted to spread the upper sealing lips of the sealing ring into sealing engagement with the sealing surfaces of the cylindrical members as the upper setting ring and the sealing ring are moved toward each other; and means for setting the seal by moving the setting rings toward the sealing ring to spread the sealing lips into sealing contact with the sealing surfaces of the cylindrical members, said means comprising external threads on a portion of the outer surface of the inner cylindrical member above the sealing surfaces of the cylindrical members; and a packoff nut having internal threads to mate with the external threads on the inner cylindrical member and adapted to contact the upper setting ring in a manner which allows the packoff nut when engaged with the external threads and rotated to seat the lower setting ring upon the shoulder and thereafter to move the setting rings toward the sealing rings to spread the sealing lips into sealing contact with the sealing surfaces of the cylindrical members.

9. An oil and gas well casing seal for sealing the annular volume existing between a vertically extending outer cylindrical member having an inner sealing surface and a vertically extending inner cylindrical member having an outer sealing surface, one of the cylindrical members having a shoulder extending into the annular volume below the sealing surfaces, comprising:

a circular sealing ring having both its upper and lower surfaces channeled to leave two upper sealing lips and two lower sealing lips;

a circular lower setting ring having its lower end adapted to seat upon the shoulder extending into the annular volume and having its upper end disposed within the lower channel of the sealing ring and adapted to spread the lower sealing lips of the sealing ring into sealing engagement with the sealing surfaces of the cylindrical members as the lower setting ring and the sealing ring are moved toward each other; and a circular upper setting ring having its lower end disposed within the upper channel of the sealing ring and adapted to spread the upper sealing lips of the sealing ring into sealing engagement with the sealing surfaces of the cylindrical members as the upper setting ring and the sealing ring are moved toward each other;

means for connecting the setting rings to the sealing ring comprising a shoulder within the upper setting ring defined by a first hole passing vertically through the upper setting ring and a second larger diameter coaxial hole in the upper portion of the upper setting ring passing part way through the upper setting ring and a retrieval rod which passes through the first hole and is affixed to the sealing ring, the retrieval rod having a retrieval head which seats upon the shoulder within the upper setting ring when the upper setting ring and the sealing ring are moved apart to the extent that the upper sealing lips are not being forced against the sealing surfaces of the cylindrical members by the upper setting ring.

10. An oil and gas well casing seal for sealing the annular volume existing between a vertically extending outer cylindrical member having an inner sealing surface and a vertically extending inner cylindrical member having an outer sealing surface, one of the cylindrical members having a shoulder extending into the annular volume below the sealing surfaces, comprising:

a circular sealing ring having both its upper and lower surfaces channeled to leave two upper sealing lips and two lower sealing lips;

a circular lower setting ring having its lower end adapted to seat upon the shoulder extending into the annular volume and having its upper end disposed within the lower channel of the sealing ring and adapted to spread the lower sealing lips of the sealing ring into sealing engagement with the sealing surfaces of the cylindrical members as the lower setting ring and the sealing ring are moved toward each other;

a circular upper setting ring having its lower end disposed within the upper channel of the sealing ring and adapted to spread the upper sealing lips of the sealing ring into sealing engagement with the sealing surfaces of the cylindrical members as the upper setting ring and the sealing ring are moved toward each other; and means for connecting the setting rings to the sealing ring a shoulder within the lower setting ring defined by a first hole passing vertically through the lower setting ring and a second larger diameter coaxial hole in the lower portion of the lower setting ring passing part way through the lower setting ring and a retrieval rod which passes through the first hole and is affixed to the sealing ring, the retrieval rod having a retrieval head which seats upon the shoulder within the lower setting ring when the lower setting ring and the sealing ring are moved apart to the extent that the lower sealing lips are not being forced against the sealing surfaces of the cylindrical members by the lower setting ring.

* * * * *